(12) United States Patent
Ferrara et al.

(10) Patent No.: US 9,082,063 B2
(45) Date of Patent: Jul. 14, 2015

(54) SYSTEMS AND METHODS FOR IMPLEMENTING SELECTABLE ROLL POSITIONING FOR WEB PRINTING IN A POST PROCESSING DEVICE OF AN IMAGE FORMING SYSTEM

(71) Applicant: XEROX Corporation, Norwalk, CT (US)

(72) Inventors: Joseph M. Ferrara, Webster, NY (US); Joseph J. Ferrara, Webster, NY (US); Paul M. Fromm, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 105 days.

(21) Appl. No.: 13/944,637

(22) Filed: Jul. 17, 2013

(65) Prior Publication Data

US 2015/0022834 A1    Jan. 22, 2015

(51) Int. Cl.
*B65H 20/00* (2006.01)
*B41J 15/04* (2006.01)
*G06K 15/16* (2006.01)
*B65H 20/02* (2006.01)

(52) U.S. Cl.
CPC ............. *G06K 15/16* (2013.01); *B41J 15/04* (2013.01); *B65H 20/00* (2013.01); *B65H 20/02* (2013.01)

(58) Field of Classification Search
None
See application file for complete search history.

(56) References Cited

U.S. PATENT DOCUMENTS

| | | | | |
|---|---|---|---|---|
| 4,331,302 A | * | 5/1982 | Ivary et al. | 242/578 |
| 4,364,503 A | * | 12/1982 | Ivary et al. | 101/93.07 |
| 4,508,252 A | * | 4/1985 | Ivary et al. | 226/44 |
| 5,967,512 A | * | 10/1999 | Irsik | 226/177 |
| 6,622,958 B1 | * | 9/2003 | Luomi et al. | 242/541.1 |

* cited by examiner

*Primary Examiner* — Jill Culler
(74) *Attorney, Agent, or Firm* — Ronald E. Prass, Jr.; Prass LLP

(57) ABSTRACT

A system and method are provided for implementing selectable roll positioning for web printing in devices, including post processing devices, for advanced image forming systems. A selectable drive system for continuous feed or web material image receiving medium substrate can "with the flip of a switch" transition the drive system from a tensioned web (transport) pulling system in a downstream device to a slack web nip-drive system as may be dictated by other system and/or operating characteristics. The selection of a particular drive method is based on a constitution of the continuous feed or web material image receiving media; a composition of a marking material deposited on the continuous feed or web material image receiving media; or a post-processing technique that the continuous feed or image receiving media, as marked, may undergo in the production of an output document.

20 Claims, 5 Drawing Sheets

SYSTEMS AND METHODS FOR IMPLEMENTING SELECTABLE ROLL POSITIONING FOR WEB PRINTING IN A POST PROCESSING DEVICE OF AN IMAGE FORMING SYSTEM

BACKGROUND

1. Field of Disclosed Subject Matter

This disclosure relates to systems and methods for implementing selectable roll positioning for driving continuous feed image receiving media in web printing devices, including post processing devices, for advanced image forming systems.

2. Related Art

Many modern, sometimes complex, image forming systems make use of continuous feed or web material image receiving media, which is fed from rolls or stacks as the image receiving media sources. FIG. 1 illustrates a block diagram of a general configuration of an image forming system 100 that employs continuous feed or web material image receiving media. A roll of web material image receiving media 110 is provided as an image receiving media source. Images are printed on the continuous feed or web material image receiving media in particular page layouts, for example, according to instructions from an image production source (not shown) by a media marking device 120.

Media marking devices, as those devices may be referenced throughout this disclosure, are not intended to be devices that are restricted to employment of any particular media marking materials, e.g., inks, toners and the like, or to any particular delivery mechanisms for those media marking materials, including but not limited to, xerographic image forming, inkjet delivery, laser marking, lithographic ink delivery or the like. Further, the media marking devices described in this disclosure may include initial image finishing components, e.g., fuser modules for fusing and/or fixing the delivered media marking materials on the surface of the image receiving media substrates by heat, pressure, or a combination of the two. It should be recognized, however, that the initial image finishing components may be separate, stand-alone devices or may be incorporated as portions of other media post-processing devices 130, as are discussed in greater detail below.

Downstream, in a process direction, of the media marking device 120 may be one or more media post-processing devices 130 for executing post-processing on the now-imaged continuous feed or web material image receiving media prior to forwarding a finished printed document to a media output receptacle 140 for recovery by a user. The post-processing carried out on the media by the post-processing devices 130 can involve one or more of myriad methodologies that are implemented for document finishing. The media post-processing devices 130 may employ technologies for fixing images on the surfaces of the continuous feed or web material image receiving media.

Differing technologies, in addition to the heat and pressure fusing mentioned above, for fixing images on the surface of the continuous feed or web material image receiving media may include, for example, waxing, oiling and/or clear coating a surface of the continuous feed or web material image receiving media on which image marking material has been deposited. An objective of all efforts at image fixing in this regard is an attempt to preserve the quality and the integrity of the marking material image deposited on the image receiving media substrate throughout the document handling that is required by post-processing leading to production of an output document. The media post-processing devices 130 may then cut individual pages from the continuous feed or web material image receiving media, and stack and collate those pages, and drill and bind those pages, as a finished output document.

SUMMARY OF THE DISCLOSED EMBODIMENTS

Handling of continuous feed or web material image receiving media in complex image forming systems, such as those systems described generally above, requires particular attention once marking material has been deposited on the image receiving media and while the marked images undergo post-processing. Image durability issues may be addressed in post-processing and finishing devices in a number of ways including heat/pressure fusing and/or over coatings including waxes, oils, acrylics or other clear coatings, and many other techniques, objectives of which are to attempt to ensure that the marking material, e.g., ink or toner, does not offset in or onto downstream post-processing devices.

Continuous feed or web material image receiving media can generally be transported through a complex image forming system, and individual devices of that image forming system, by one of two transport mechanisms depending on particular characteristics of the operations undertaken by the individual devices, and particularly post-processing devices. In individual devices that may comprise the increasingly complex image forming systems, consideration must be taken on how to control the transport of the continuous feed or web material image receiving media as it passes through each of the particular devices that may be arranged in differing orders and in differing configurations to make up the image forming systems. The two generally-understood typical scenarios that exist with regard to driving the continuous feed or web material image receiving media are that: (1) the continuous feed or web material image receiving media may be pulled through the system by a downstream device, creating generally a tight or tensioned (or wrap) web through the system, or at least in individual devices in the system; and/or (2) the continuous feed or web material image receiving media may be generally slackened as it enters the downstream device, in which case, the continuous feed or web material image receiving media is driven by a pressure nip acting on the continuous feed or web material image receiving media in the downstream device. Regardless of the mechanism, in order to preserve image quality and not damage the continuous feed or web material image receiving media, there is a need to control a speed of transport of the material through each of the devices and through the system overall so that the continuous feed or web material image receiving media does not bind between devices, and otherwise does not break as it is passed through the system and passed through the individual devices that comprise that system.

These separate mechanisms are generally exclusive to one another in individual devices, i.e., there may be a tensioned web pulled transport system or slackened web nip-based transport system, but not both in individual devices. Placement of any specific device often requires the inclusion of additional tensioning or slackening buffering devices, generally referred to as "buffer boxes," emplaced between the devices to handle speed changes and transitions between the differing drive techniques that may be dictated by the processing in the individual devices comprising the system based on potentially differing web transport mechanisms in the individual devices. In complex image forming systems, however, individual component devices are often exchanged for any number of reasons in a number of circumstances. When these circumstances arise, there may coincidentally arise a desire, or even a necessity, in the downstream and/or post-processing devices to swap out a tensioned web post-processor for a slack web nip-driven post processor. Random incidental system component reconfiguration requiring changes to additional components based on a single change of any particular device, such as a marking device, in a continuous feed or web material image receiving medium substrate system, leads to added expense for customers and increased customer dissatisfaction.

It would be advantageous in view of the above-noted circumstances arising from image processing and device variations in complex image forming systems employing continuous feed or web material image receiving media substrates to implement a processing or post-processing device that may have a selectable drive system for the continuous feed or web material image receiving media.

Exemplary embodiments of the systems and methods according to this disclosure may implement a selectable drive system for continuous feed or web material image receiving media that can "with the flip of a switch" transition from a tensioned web (transport) pulling system in a downstream device to a slack web nip-drive system, as may be dictated by other system characteristics. The selection of a particular drive method may be based on system characteristics that may include, for example, a constitution of the continuous feed or web material that comprises the image receiving media; a composition of the marking material deposited on the continuous feed or web material image receiving media; one or more post-processing methodologies for fusing, fixing or finishing the image marking material on the continuous feed or web material image receiving media substrate; and/or other post-processing techniques that the continuous feed or image receiving media substrate, as marked, may undergo in the production of an output document.

Exemplary embodiments may address issues arising from the use of post-processing devices that implement a number of different post-processing technologies including a post-processing oiling system, for example, when driving continuous feed or web material image receiving media.

In embodiments, a user may be provided a simple mechanism by which to cause a particular post-processing device to transition from a nip driven slackened web drive system to a tensioned web drive system, and back, as characteristics of a particular system configuration and/or of a particular image forming or document production operation may dictate.

Exemplary embodiments may provide, within a single, unitary processing, post-processing, or image receiving media transport device, a combination of opposing assemblies that are movable with respect to one another according to manipulation by an assembly movement mechanism in order to, upon selection, (1) create a drive nip between facing opposing rollers, or (2) form a roller-directed tension web transport path between offset opposing rollers.

Exemplary embodiments may provide for a more versatile set of processing or post-processing devices to allow for a downstream device to pull the continuous feed or web material image receiving media through the system or for the continuous feed or web material image receiving media to be fed into the downstream device by a web driven nip.

Exemplary embodiments may allow speed control on a tensioned downstream device to be more easily controlled through a wrap set up rather than a nip where a nip would be better suited for a slack web device downstream.

Exemplary embodiments may address difficulties experienced in certain conventional continuous feed or web material image receiving media systems by providing a common and selectable processing or post-processing device by which to implement a series of processing or post-processing techniques according to the characteristics of the processing or post-processing techniques rather than constraints based on a configuration of the drive system for the processing or post-processing device. In this regard, the exemplary embodiments may benefit flexibility in system configuration, particularly with regard to post-processing operations, in complex image forming systems allowing for individual system components to be replaced without the need to consider the characteristics of the drive systems in other downstream and post-processing devices already resident within the complex image forming system.

These and other features, and advantages, of the disclosed systems and methods are described in, or apparent from, the following detailed description of various exemplary embodiments.

BRIEF DESCRIPTION OF THE DRAWINGS

Various exemplary embodiments of the disclosed systems and methods for implementing selectable roll positioning for driving continuous feed web printing in a processing or post-processing device for advanced image forming systems will be described, in detail, with reference to the following drawings, in which.

DETAILED DESCRIPTION OF THE DISCLOSED EMBODIMENTS

Figure 1:
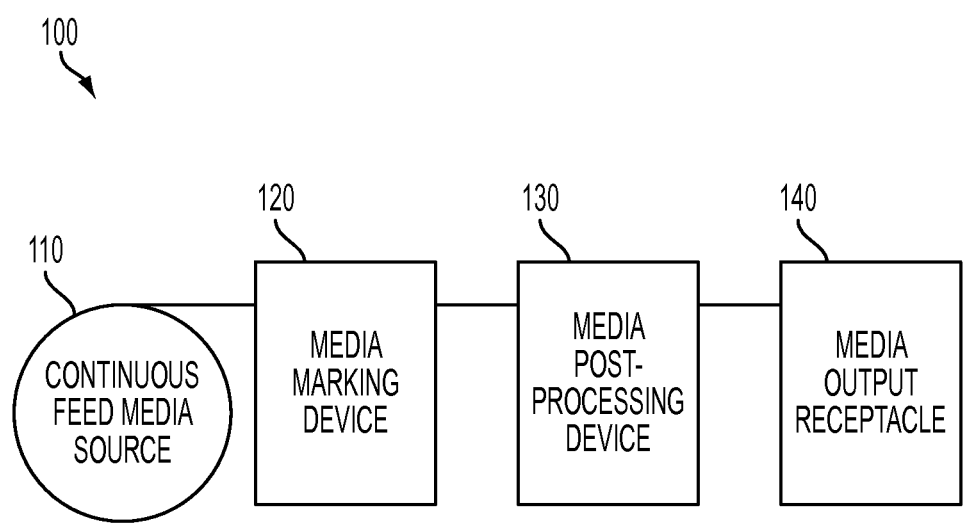
FIG. 1 illustrates a block diagram of a general configuration of an image forming system that employs continuous feed or web material as an image receiving media substrate.

The systems and methods for implementing selectable roll positioning for driving continuous feed web printing in a processing or post-processing device for advanced image forming systems according to this disclosure will generally refer to this specific utility or function for those systems and methods. Exemplary embodiments described and depicted in this disclosure should not be interpreted as being specifically limited to any particular configuration of the described elements, or as being specifically directed to any particular intended use, including any particular functioning or operation of a processing, post-processing or other component device in an image forming system in which selectable roll positioning components may be advantageously employed. Any advantageous combination of schemes that may employ a particular structure or scheme for providing a configuration of rolls, in a single device, that are selectable to transition a drive mode for the continuous feed or web material image receiving media between a slackened web nip driving configuration and a tensioned (pulled) web driving configuration are contemplated as being encompassed by this disclosure.

Specific reference to, for example, various configurations of image forming systems and component devices within those systems, including post-processors, as those concepts and related terms are captured and used throughout this disclosure, should not be considered as limiting those concepts or terms to any particular configuration of the respective devices, the system configurations or individual elements. The subject matter of this disclosure is intended to broadly encompass systems, devices, schemes and elements that may involve image forming and finishing operations as those operations would be familiar to those of skill in the art. The disclosed concepts are particularly adapted to selectable driving for the continuous feed or web material image receiving media in a complex image forming system comprising multiple component devices for image marking and media post-processing, as those concepts are understood by those of skill in the imaging and image forming arts.

The disclosed schemes may particularly address issues that arise in many different forms of post-processing devices when driving a web material image receiving media substrate through those post-processing devices including, for example, a post-process oiling system. According to the disclosed schemes, an operator may select a nip driven slackened web drive configuration or a tensioned web wrap drive system. In the latter configuration, applicator assemblies and associated rollers are positioned independently of one another as top and bottom independent assemblies are made to slide back and forth relative to one another on, for example, some manner of track system between independent positions that will be described in greater detail below.

Selectable configurations for processing, post-processing and other component devices allow for a more versatile system configuration that can allow for a downstream device to pull a sheet through the system or for the paper to be fed into the downstream device by a web driven nip. Speed control on a tension downstream device may be more easily controlled through a wrap set up than a nip where a nip would be better suited for a slack web device downstream.

In particular embodiments, the disclosed schemes and associated device configurations may address problems associated with certain conventional web material image fixing operations by facilitating a selection of a web material image receiving media substrate driving scheme to support a particular image protection method that may apply a particular protective finish uniformly to the imaged surface. These protective finishes can include clear coat finishes that may be a widely used, and commercially available, coating materials such as an automotive-like finish clear coat (acrylic lacquer). The coating would be sprayed using a thin coating thickness. It may be modified for viscosity or coefficient of friction to better fit the application, but would still maintain the benefits of the coating material and application method. Such a coating may be comparatively very durable over a wide temperature range and may be resistant to damage. The thin coating would facilitate low cost as well as faster drying time. Because the application scheme is in spray form, the thin coating should protect the entire image surface and follow its surface contours without the risk of "pooling" encountered with, for example, a roll-applied coating, which can delay drying. Also, a risk of post-printing contamination of any finishing equipment may be largely eliminated. The coating should be able to be applied with commonly available spray coating systems at system required speeds and dried with any one of several standard drying methods. A venting system, also readily available from numerous sources, may also be used. Benefits of the proposed configurations and schemes for driving the web could be optimized to support clear coat post-processing, where appropriate, with a tensioned web drive configuration and yet leave available an option for closed nip driving in support of other post-processing methods.

Figure 2:
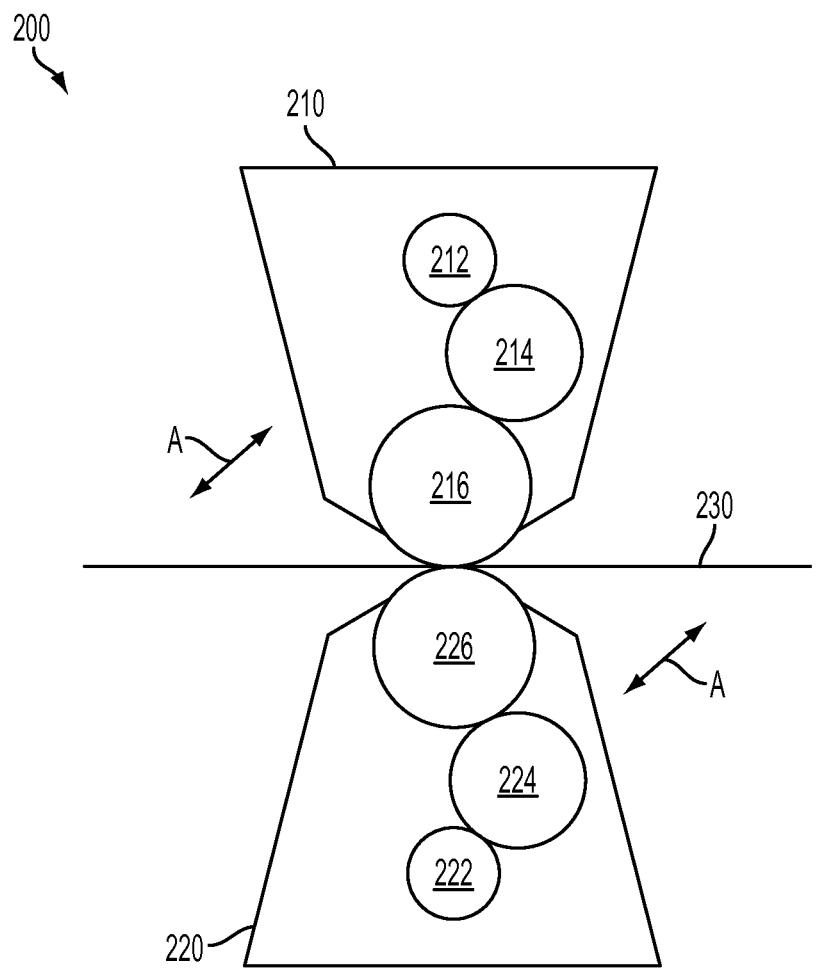
FIG. 2 illustrates a simple schematic diagram of a selectable roll positioning system with opposing rolls positioned to face each other to form a nip to support slackened web nip driving for the continuous feed or web material image receiving media according to this disclosure.
Figure 3:
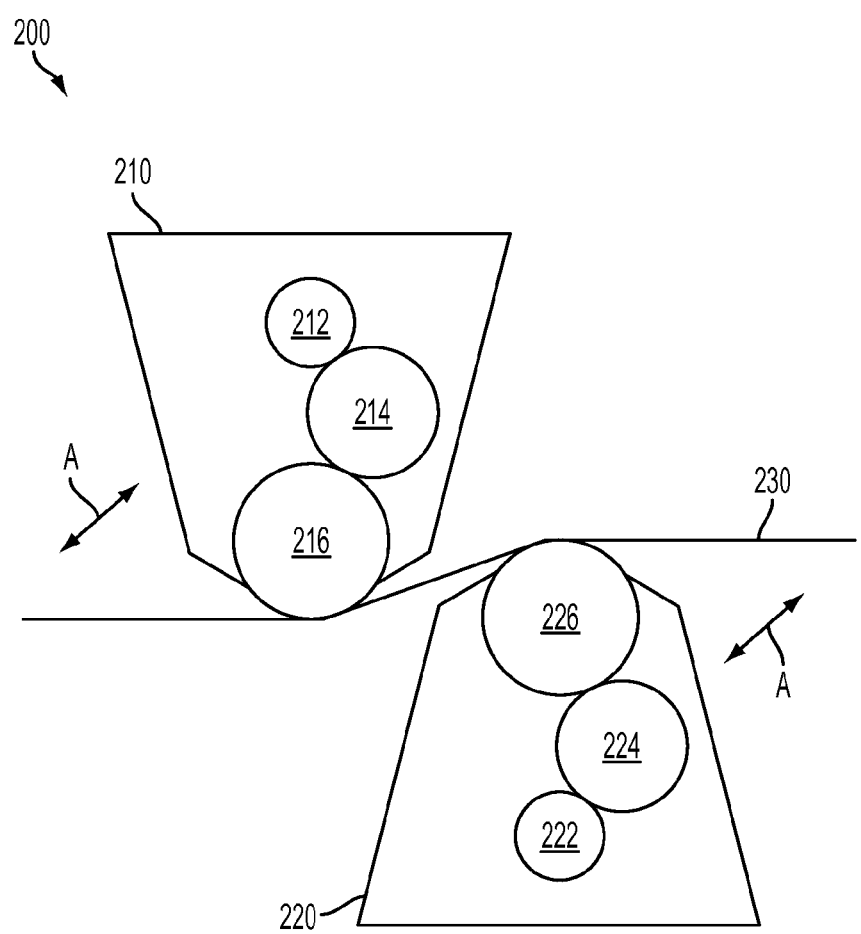
FIG. 3 illustrates a simple schematic diagram of the selectable roll positioning system of FIG. 2 with the opposing rolls positioned to be offset from each other to support tensioned web driving for the continuous feed or web material image receiving media according to this disclosure.

FIG. 2 illustrates a simple schematic diagram of a selectable roll positioning system 200 with opposing rolls 216,226 positioned to face each other to form a nip to support slackened web nip driving for the continuous feed or web material image receiving media 230 according to this disclosure. FIG. 3 illustrates a simple schematic diagram of the selectable roll positioning system 200 of FIG. 2 with the opposing rolls 216,226 positioned to be offset from each other to support tensioned web driving for the continuous feed or web material image receiving media 230 according to this disclosure.

Generally, as shown in FIGS. 2 and 3, each of two independently movable opposing top and bottom assemblies 210, 220 may be selectably positioned in directions "A" between a first position, as shown in FIG. 2 (to form a nip to support slackened web nip driving for the continuous feed or web material image receiving media 230), and a second position, as shown in FIG. 3 (to support tensioned web driving for the continuous feed or web material image receiving media 230). The selectable nature of the system shown in FIGS. 2 and 3 allows for flexibility in system configurations that may reduce a number of individual modules or devices that a customer may need to have on hand, or to procure, when modifying a configuration of the system with a change in a particular device or module within the system. For example, the selectable configuration may reduce or otherwise eliminate a need for particular and separate image receiving media handling devices, e.g., infeed and outfeed devices, that serve no other practical purpose, except to support media handling and transport, and variations in media handling and transport control or speeds, through the image forming system.

Each of the two semi-independently movable opposing top and bottom assemblies 210,220 may be configured to accomplish one or more of image processing or post-processing, or to document processing or post-processing, tasks. These tasks may include heating and pressure fusing functions in a nip based slackened web device in which one or the other of the opposing rolls 216,226 shown in FIG. 2 may be heated. These tasks may include coating of one or the other of the surfaces of the image receiving media substrates, or images deposited thereon, with coatings that may be sprayed on, and then transported via a tensioned web configuration past the offset opposing rolls 216,226 in a configuration such as that shown in FIG. 3.

The opposing rolls 216,226 in each of the top and bottom assemblies 210,220 may be driven independently, or in a coordinated manner by one or more support or drive rolls 212,214 (in the top assembly 210) and 222,224 (in the bottom assembly 220). These support or drive rolls may carry out specific driving, cleaning, liquid distribution or other like tasks as those rolls would be understood to carry out by those of skill in the art.

Those of skill in the art recognize that there are circumstances in which nip-paired rollers are less than optimum for transport of the continuous feed or web material image receiving media through an image forming system. Failure to align the opposing rollers precisely, for example, may lead to skewing and/or wandering of the image receiving media as it passes through the system. Excessive wander may cause damage to the substrate, and potentially any images formed but not yet fixed thereon, as the image receiving media impacts fixed structural sides of the image receiving media transport path in the image forming system.

Those of skill in the art recognize that there are circumstances in which tensioned web transport is less than optimum for transport of the continuous feed or web material image receiving media through the image forming system. The tensioned web material being pulled across surfaces of the offset transport path rollers may lead to pick off of material deposited on the imaged receiving media as it passes through the system. Generally, based on characteristics of the marking materials, the devices and the substrate materials, a particular drive system will be most beneficial, i.e., exhibit the least detrimental disadvantages. The selectability introduced by the systems and methods according to this disclosure allows for the driving system to be optimized according to user needs.

Figure 4:
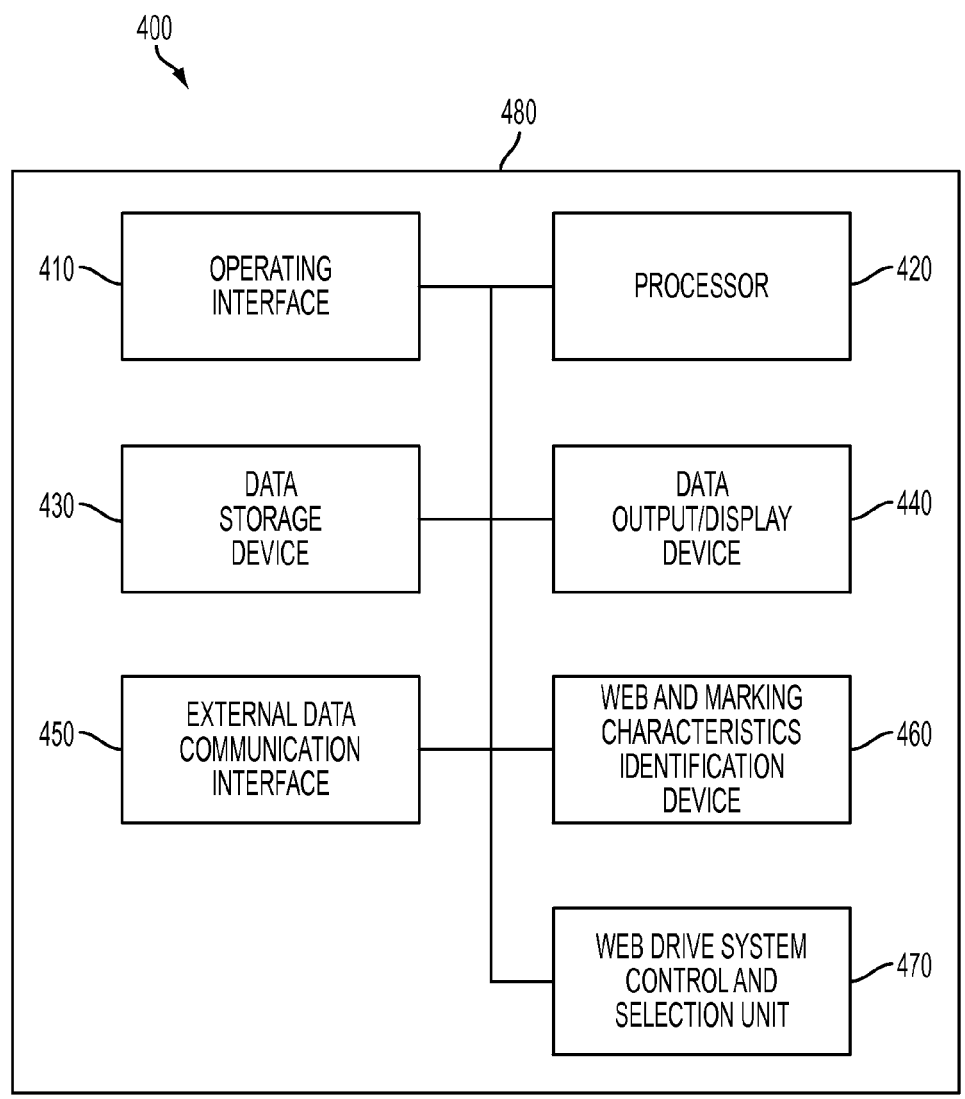
FIG. 4 illustrates a block diagram of a control system for controlling characteristics of a selectable roll positioning system to position opposing rolls so as to face each other to form a nip in one mode of operation or to position the opposing rolls to be offset from each other in another mode of operation for driving the continuous feed or web material image receiving media according to this disclosure.

FIG. 4 illustrates a block diagram of a control system 400 for controlling characteristics of a selectable roll positioning system to position opposing rolls so as to face each other to form a nip in one mode of operation or to position the opposing rolls to be offset from each other in another mode of operation for handling the continuous feed or web material image receiving media according to this disclosure. The exemplary control system shown in FIG. 4 may be implemented as a unit integral to a complex image forming system, or it may be implemented as a separate unit remote from, and in communication with, the complex image forming system.

The exemplary control system 400 may include an operating interface 410 by which a user may communicate with the exemplary control system 400 for directing at least a mode of operation of the selectable roll positioning system in the image forming system, as well as controlling at least a speed of transport of the continuous feed or web material image receiving media through the image forming system. Control inputs received in the exemplary control system 400 via the operating interface 410 may be processed and communicated to the image forming system via a web drive system control and selection unit 470.

The operating interface 410 may be a locally accessible user interface associated with the image forming system, which may be configured as one or more conventional mechanisms common to control devices and/or computing devices that may permit a user to input information to the exemplary control system 400. The operating interface 410 may include, for example, a conventional keyboard, a touchscreen with "soft" buttons or with various components for use with a compatible stylus, a microphone by which a user may provide oral commands to the exemplary control system 400 to be "translated" by a voice recognition program, or other like device by which a user may communicate specific operating instructions to the exemplary control system 400. The operating interface 410 may be a part of a function of a graphical user interface (GUI) mounted on, integral to, or associated with, the image forming system with which the exemplary control system 400 is associated to direct processing or post-processing image receiving media transport in the associated image forming system.

The exemplary control system 400 may include one or more local processors 420 for individually operating the exemplary control system 400 and for carrying out operating functions of at least mode selection for the selectable roll positioning system. The processor 420 may reference, for selection of a particular drive method, system characteristics that may include, for example, a constitution of the continuous feed or web material that comprises the image receiving media; a composition of the marking material deposited on the continuous feed or web material image receiving media; one or more post-processing methodologies for fusing, fixing or otherwise finishing the image marking material on the continuous feed or web material image receiving media; and/or other post-processing techniques that the continuous feed or web material image receiving media substrate, as marked, may undergo in the production of the output document as may be catalogued and collected in or by a web and marking characteristics identification device 460.

Processor(s) 420 may include at least one conventional processor or microprocessor that interprets and executes instructions to direct specific functioning of the exemplary control system 400 and an associated image forming system for processing and/or post-processing of the documents.

The exemplary control system 400 may include one or more data storage devices 430. Such data storage device(s) 430 may be used to store data or operating programs to be used by the exemplary control system 400, and specifically the processor(s) 420 in carrying into operation the disclosed functions. Data storage device(s) 430 may be used to store information regarding the above-listed examples of applicable image forming system characteristics. Stored schemes and operating parameters may be referenced to control aspects of the image forming functions of the selectable roll positioning system.

The data storage device(s) 430 may include a random access memory (RAM) or another type of dynamic storage device that is capable of storing updatable database information, and for separately storing instructions for execution of system operations by, for example, processor(s) 420. Data storage device(s) 430 may also include a read-only memory (ROM), which may include a conventional ROM device or another type of static storage device that stores static information and instructions for processor(s) 420. Further, the data storage device(s) 430 may be integral to the exemplary control system 400, or may be provided external to, and in wired or wireless communication with, the exemplary control system 400.

The exemplary control system 400 may include at least one data output/display device 440, which may be configured as one or more conventional mechanisms that output information to a user, including, but not limited to, a display screen on a GUI of the image forming system with which the exemplary control system 400 may be associated. The data output/display device 440 may be used to indicate to a user a status of the selectable roll positioning system including a mode of operation of the position of the rolls, and/or characteristics of other devices that may signal to a user, based on inputs from the processor, that a mode of operation of the selectable roll positioning system, and/or a position of the rolls should be changed from a current mode/position to another mode/position.

Where appropriate, the exemplary control system 400 may include at least one external data communication interface 450 by which the exemplary control system 400 may communicate with the image forming system for effecting image forming operations and post-processing operations including selectable roll positioning when the exemplary control system 400 is mounted remotely from, and in wired or wireless communication with, the associated image forming system.

A web and marking characteristics identification device 460 may be provided as a standalone device or as a portion, and/or as a function, of the processor 420 in communication with the at least one data storage device 430. The web and marking characteristics identification device 460 may collect and process information that may be used for selection of a particular drive method. The information may be collected from sensors in the image forming system, or it may be collected from user inputs via the operating interface 410, or it may be retrieved from instructions sent to the image forming system for conducting image forming and/or post-processing steps in support of producing finished output documents from input continuous feed or web material image receiving media in the image forming system. As indicated above, the collected information may be based on system characteristics that may include, for example, a constitution of the continuous feed or web material that comprises the image receiving media; a composition of the marking material deposited on the continuous feed or web material image receiving media; one or more post-processing methodologies for fusing, fixing or finishing the image marking material on the continuous feed or web material image receiving media substrate; and/or other post-processing techniques that the continuous feed or web material image receiving media substrate, as marked, may undergo in the production of the output document.

The web drive system control and selection unit 470 may formulate instructions to the user for web drive system control and/or translate user inputs received by the user via the operating interface 410 to move components of the selectable roll positioning system between its various modes of operation and to provide feedback to the user as to in which mode of operation the selectable roll positioning system the system is currently being operated.

All of the various components of the exemplary control system 400, as depicted in FIG. 4, may be connected internally, and potentially to a processing or post-processing device in an image forming system, by one or more data/control busses 480. These data/control busses 480 may provide wired or wireless communication between the various components of the exemplary control system 400, whether all of those components are housed integrally in, or are otherwise external and connected to, other components of an image forming system with which the exemplary control system 400 may be associated.

It should be appreciated that, although depicted in FIG. 4 as an essentially integral unit, the various disclosed elements of the exemplary control system 400 may be arranged in any combination of sub-systems as individual components or combinations of components, integral to a single unit, or external to, and in wired or wireless communication with, the single unit of the exemplary control system 400. In other words, no specific configuration as an integral unit or as a support unit is to be implied by the depiction in FIG. 4. Further, although depicted as individual units for ease of understanding of the details provided in this disclosure regarding the exemplary control system 400, it should be understood that the described functions of any of the individually-depicted components may be undertaken, for example, by one or more processors 420 connected to, and in communication with, one or more data storage device(s) 430, all of which may support operations in the associated image forming system.

Figure 5:
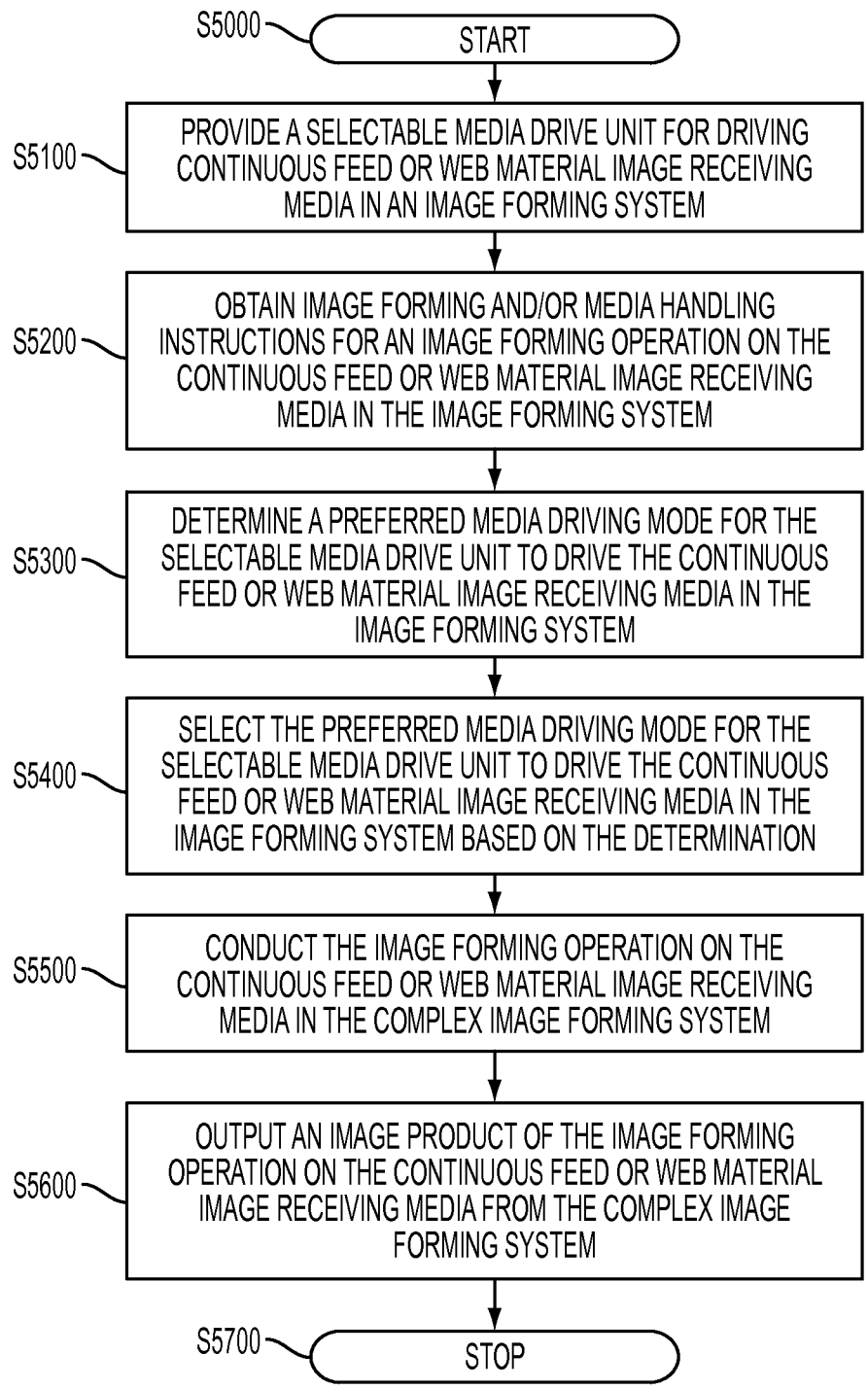
FIG. 5 illustrates a flowchart of an exemplary method for implementing a control scheme for controlling characteristics of a selectable roll positioning system to position opposing rolls so as to face each other to form a nip in one mode of operation or to position the opposing rolls to be offset from each other in another mode of operation for driving the continuous feed or web material image receiving media according to this disclosure.

The disclosed embodiments may include a method for implementing a control scheme for controlling characteristics of a selectable roll positioning system to position opposing rolls so as to face each other to form a nip in one mode of operation or to position the opposing rolls to be offset from each other in another mode of operation for driving the continuous feed or web material image receiving media. FIG. 5 illustrates a flowchart of such an exemplary method. As shown in FIG. 5, operation of the method commences at Step S5000 and proceeds to Step S5100.

In Step S5100, a selectable media drive unit including a selectable roll positioning system may be provided in one or more devices, including one or more post processing devices, in an image forming system. The presence of a selectable roll positioning system provides an opportunity to customize a media transport path for a continuous feed or web material image receiving media as the image receiving media is driven through the image forming system. Even as individual element devices are provided and potentially replaced, the presence of a selectable roll positioning system according to this disclosure may generally obviate a need to change image receiving media component drive devices in the image forming system. Operation of the method proceeds to Step S5200.

In Step S5200, image forming and/or media handling instructions may be obtained for the production of an output image product according to a specified image forming operation in the image forming system. Operation of the method proceeds to Step S5300.

In Step S5300, a preferred media driving mode for the continuous feed or media material image receiving media, among a plurality of driving modes for the selectable roll positioning system, may be determined. The preferred media driving mode may be determined based on system characteristics and/or parameters of the directed image forming operation including a constitution of the continuous feed or web material that comprises the image receiving media; a composition of a marking material deposited on the continuous feed or web material image receiving media; one or more post-processing methodologies for fusing, fixing or finishing the image marking material on the continuous feed or web material image receiving media; and/or other post-processing techniques that the continuous feed or image receiving media, as marked, may undergo in the production of the output image product. Operation of the method proceeds to Step S5400.

In Step S5400, a selection of the preferred media driving mode, as determined, may be directed. The selection of the preferred driving mode may be according to a user input via a user input interface, or may be automated based on the determination. Operation of the method proceeds to Step S5500.

In Step S5500, the directed image forming operation may be performed once the preferred media driving mode for the continuous feed or web material image receiving media has been selected. In embodiments, if a conflict is detected between the determined preferred media driving mode and the selected media driving mode is detected, the image forming operation may be, for example, inhibited until the user takes further action which may include manual selection of the preferred media driving mode, even in an automated system, cancelling of the image forming operation, or a user override function causing the image forming operation to proceed with the selectable media drive unit operating in other than the preferred media driving mode. Other user input options may be provided. Operation of the method proceeds to Step S5600.

In Step S5600, the image product formed and/or generated according to the image forming operation instructions may be output from the image forming system. Operation of the method proceeds to Step S5700, where operation of the method ceases.

It should be recognized that, in complex image forming systems, multiple media transport paths may be established. A single selectable media drive unit including a selectable roll positioning system may support image receiving media transport among multiple paths switching, as appropriate, between the plurality of media driving modes according to each obtained image forming operation.

The above-described exemplary systems and methods reference certain conventional components to provide a brief, general description of suitable document processing and post-processing means by which to carry out the disclosed image receiving media transport techniques in support of obtained image forming operations in the image forming system. Those skilled in the art will appreciate that other embodiments of the disclosed subject matter may be practiced with many types and configurations of individual devices and combinations of devices particularly common to image forming and post processing of image formed products in image forming devices of varying complexity. No limitation to the variety or configuration of individual component devices included in image forming systems of varying complexity is to be inferred from the above description.

The exemplary depicted sequence of executable instructions represents one example of a corresponding sequence of acts for implementing the functions described in the steps. The exemplary depicted steps may be executed in any reasonable order to carry into effect the objectives of the disclosed embodiments. No particular order to the disclosed steps of the method is necessarily implied by the depiction in FIG. 5, and the accompanying description, except where a particular method step is a necessary precondition to execution of any other method step. Individual method steps may be carried out in sequence or in parallel in simultaneous or near simultaneous timing, as appropriate.

Although the above description may contain specific details, they should not be construed as limiting the claims in any way. Other configurations of the described embodiments of the disclosed systems and methods are part of the scope of this disclosure.

It will be appreciated that a variety of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

We claim:

1. A method for handling a continuous feed web material image receiving medium in an image forming system, comprising:
providing a continuous feed web material image receiving medium in an image forming system;
providing a multi-mode media handling system in the image forming system, the multi-mode media handling system having at least two separately-selectable modes of operation for handling the continuous feed web material image receiving medium comprising:
a nip-based media driving mode of operation in which at least two opposing rollers are positioned in a first position to face each other in a manner that forms a media driving nip, and
a dual tensioned-web supporting mode of operation configured with the at least two opposing rollers positioned in a second position offset from each other in a transport direction with the at least two opposing rollers maintaining tensioned contact with the continuous feed web material image receiving medium;
selecting one of the at least two separately-selectable modes of operation for handling the continuous feed web material image receiving medium;
positioning the at least two opposing rollers according to the selected one of the at least two separately-selectable modes of operation for handling the continuous feed web material image receiving medium with the at least two opposing rollers maintaining tensioned contact with the continuous feed web material image receiving medium in each of the at least two separately-selectable modes of operation for handling the continuous feed web material image receiving medium; and
executing image receiving medium handling operations in the image forming system once the at least two opposing rollers are positioned according to the selected one of the at least two separately-selectable modes of operation for handling the continuous feed web material image receiving medium.

2. The method of claim 1, further comprising determining, with a processor, which of the at least two separately-selectable modes of operation is relatively preferable.

3. The method of claim 2, the determining being based on at least one of a material from which the continuous feed web material image receiving medium is formed, a marking material deposited on the continuous feed web material image receiving medium to create images thereon, a post-processing technique for fusing, fixing or finishing the marking material on the continuous feed or web material image receiving media; and other post-processing techniques that the continuous feed or image receiving media, as marked, may undergo in the production of an output image product.

4. The method of claim 2, further comprising presenting a result of the determining to a user.

5. The method of claim 4, the presenting comprising displaying the result of the determining to the user on a display device associated with the image forming system.

6. The method of claim 5, the selecting of the one of the at least two separately-selectable modes of operation for handling the continuous feed web material image receiving medium comprising receiving from the user an input selection via a user interface associated with the image forming system.

7. The method of claim 2, the selecting of the one of the at least two separately-selectable modes of operation for handling the continuous feed web material image receiving medium comprising executing an automatic selecting of the one of the at least two separately-selectable modes of operation according to a result of the determining.

8. The method of claim 2, further comprising inhibiting the executing of the image receiving medium handling operations in the image forming system when the selected one of the at least two separately-selectable modes of operation for handling the continuous feed web material image receiving medium differs from the result of the determining.

9. The method of claim 1, the dual tensioned-web supporting mode of operation being further supported by a downstream media driving device.

10. A device for handling a continuous feed web material image receiving medium in an image forming system, comprising:
a first assembly including at least a first media handling roller that faces a first surface of a continuous feed web material image receiving medium;

a second assembly including at least a second media handling roller that faces a second surface of the continuous feed web material image receiving medium; and a processor configured, to implement multi-mode media handling operations including selection among at least two separately-selectable modes of operation for handling the continuous feed web material image receiving medium by controlling relative movement of the first assembly and the second assembly between at least a nip-based media driving mode of operation in which the first media handling roller and the second media handling roller are positioned in a first position to face each other in a manner that forms a media driving nip, and a dual tensioned-web supporting mode of operation configured with the first media handling roller and the second media handling roller positioned in a second position offset from each other in a transport direction with the at least two opposing rollers maintaining tensioned contact with the continuous feed web material image receiving medium.

11. The device of claim 10, the processor being further configured to select one of the at least two separately-selectable modes of operation for handling the continuous feed web material image receiving medium.

12. The device of claim 11, further comprising a positioning unit configured to position the first assembly and the second assembly according to the selected one of the at least two separately-selectable modes of operation for handling the continuous feed web material image receiving medium with the at least two opposing rollers maintaining tensioned contact with the continuous feed web material image receiving medium in each of the at least two separately-selectable modes of operation for handling the continuous feed web material image receiving medium.

13. The device of claim 12, the processor being further configured to execute image receiving medium handling operations in the image forming system once the first assembly and the second assembly are positioned according to the selected one of the at least two separately-selectable modes of operation for handling the continuous feed web material image receiving medium.

14. The device of claim 10, the processor being configured to determine which of the at least two separately-selectable modes of operation is relatively preferable.

15. The device of claim 14, the determining being based on at least one of a material from which the continuous feed web material image receiving medium is formed, a marking material deposited on the continuous feed web material image receiving medium to create images thereon, a post-processing technique for fusing, fixing or finishing the marking material on the continuous feed or web material image receiving media; and other post-processing techniques that the continuous feed or image receiving media, as marked, may undergo in the production of an output image product.

16. The device of claim 14, further comprising a display device configured for displaying a result of the determining to the user.

17. The device of claim 14, the processor being further configured to select the one of the at least two separately-selectable modes of operation for handling the continuous feed web material image receiving medium based on an input selection from a user via a user interface.

18. The device of claim 14, the processor being further configured to automatically select the one of the at least two separately-selectable modes of operation for handling the continuous feed web material image receiving medium according to a result of the determining.

19. The device of claim 14, the processor being further configured to inhibit the executing of the image receiving medium handling operations in the image forming system when the selected one of the at least two separately-selectable modes of operation for handling the continuous feed web material image receiving medium differs from a result of the determining.

20. A non-transitory computer readable medium on which is stored a set of instructions that, when executed by a processor, cause the processor to execute the steps of a method for handling a continuous feed web material image receiving medium in an image forming system, the method comprising:

providing a continuous feed web material image receiving medium in an image forming system;

providing a multi-mode media handling system in the image forming system, the multi-mode media handling system having at least two separately-selectable modes of operation for handling the continuous feed web material image receiving medium comprising:

a nip-based media driving mode of operation in which at least two opposing rollers are positioned in a first position to face each other in a manner that forms a media driving nip, and a dual tensioned-web supporting mode of operation configured with the at least two opposing rollers positioned in a second position offset from each other in a transport direction with the at least two opposing rollers maintaining tensioned contact with the continuous feed web material image receiving medium;

selecting one of the at least two separately-selectable modes of operation for handling the continuous feed web material image receiving medium;

positioning the at least two opposing rollers according to the selected one of the at least two separately-selectable modes of operation for handling the continuous feed web material image receiving medium with the at least two opposing rollers maintaining tensioned contact with the continuous feed web material image receiving medium in each of the at least two separately-selectable modes of operation for handling the continuous feed web material image receiving medium; and executing image receiving medium handling operations in the image forming system once the at least two opposing rollers are positioned according to the selected one of the at least two separately-selectable modes of operation for handling the continuous feed web material image receiving medium.

* * * * *